(12) United States Patent
Ferron et al.

(10) Patent No.: US 11,844,460 B2
(45) Date of Patent: Dec. 19, 2023

(54) COOKING VESSEL FOR COOKING FOOD HAVING A BOTTOM WALL WITH THROUGH HOLES ARRANGED IN A SYMMETRICAL MANNER

(71) Applicant: ZWILLING BALLARINI ITALIA S.R.L., Rivarolo Mantovano (IT)

(72) Inventors: Jacopo Ferron, Casalmaggiore (IT); Francesco Ferron, Casalmaggiore (IT)

(73) Assignee: ZWILLING BALLARINI ITALIA SRL, Rivarolo Mantovano (IT)

( * ) Notice: Subject to any disclaimer, the term of this patent is extended or adjusted under 35 U.S.C. 154(b) by 268 days.

(21) Appl. No.: 17/612,444

(22) PCT Filed: Apr. 29, 2020

(86) PCT No.: PCT/IB2020/054014
§ 371 (c)(1),
(2) Date: Nov. 18, 2021

(87) PCT Pub. No.: WO2020/254883
PCT Pub. Date: Dec. 24, 2020

(65) Prior Publication Data
US 2022/0240715 A1 Aug. 4, 2022

(30) Foreign Application Priority Data
Jun. 18, 2019 (IT) .................. 102019000009378

(51) Int. Cl.
*A47J 36/02* (2006.01)
*A47J 27/00* (2006.01)
(52) U.S. Cl.
CPC ............. *A47J 36/02* (2013.01); *A47J 27/002* (2013.01)
(58) Field of Classification Search
CPC ...... A47J 36/02; A47J 27/002; Y10S 220/912
(Continued)

(56) References Cited

U.S. PATENT DOCUMENTS

2002/0073986 A1 6/2002 Bhagat
2009/0321453 A1 12/2009 Bourdin et al.

FOREIGN PATENT DOCUMENTS

CN 201167839 Y * 12/2008 ............ A47J 27/022
EP 2105071 A1 9/2009
(Continued)

OTHER PUBLICATIONS

International Search Report and Written Opinion dated Jul. 21, 2020 for PCT/IB2020/054014 to Zwilling Ballarini Italia SRL filed Apr. 29, 2020.

*Primary Examiner* — J. Gregory Pickett
*Assistant Examiner* — Niki M Eloshway
(74) *Attorney, Agent, or Firm* — Vorys, Sater, Seymour and Pease LLP

(57) ABSTRACT

Food cooking vessel including a body having a bottom wall and at least one side wall. The side wall extends from the bottom wall defining an inner compartment of the cooking vessel for food being cooked. At least the bottom wall is of aluminum. The cooking vessel includes a plate-like component of a disk of ferromagnetic material, integrally coupled with the bottom wall at the respective outer surface, to at least partially cover the bottom wall outer surface. The plate-like component has through holes and is divided into first perforated areas having a first void-to-solid ratio value (VtS1) and second perforated areas having a second void-to-solid ratio value (VtS2), mutually alternated in a symmetrical manner. Each first perforated area, featuring a greater void-to-solid ratio, is in a weighted ratio with respect to the second perforated area, featuring a smaller void-to-solid ratio.

14 Claims, 5 Drawing Sheets

(58) Field of Classification Search
USPC .................................................... 220/573.1
See application file for complete search history.

(56) References Cited

FOREIGN PATENT DOCUMENTS

| | | | | |
|---|---|---|---|---|
| FR | 2801485 A1 | 6/2001 | | |
| JP | 3223636 U | * 10/2019 | ............ | A47J 27/002 |
| KR | 20040023418 A | 3/2004 | | |
| KR | 20100117410 A | 11/2010 | | |
| WO | 2013115176 A1 | 8/2013 | | |
| WO | WO-2015114581 A1 | * 8/2015 | ............ | A47J 27/002 |
| WO | WO-2016066917 A1 | * 5/2016 | ............ | A47J 27/002 |
| WO | 2019111761 A1 | 6/2019 | | |

* cited by examiner

COOKING VESSEL FOR COOKING FOOD HAVING A BOTTOM WALL WITH THROUGH HOLES ARRANGED IN A SYMMETRICAL MANNER

CROSS-REFERENCE TO RELATED APPLICATIONS

This is a § 371 National Stage Application of International Application No. PCT/IB2020/054014 filed on Apr. 29, 2020, claiming the priority of Italian Patent Application No. 102019000009378 filed on Jun. 18, 2019.

The present invention generally relates to a cooking vessel for cooking food and, in particular, to a metal vessel for cooking food that is at least partially made of aluminum and is provided with a bottom wall having through holes arranged in a symmetrical manner, i.e. differentiated in a weighted ratio.

As is known, vessels for cooking food made of aluminum are not suitable for being used on induction cooktops, which for generating heat take advantage of the electromagnetic induction principle, in that aluminum is a non-magnetic material. Therefore, in order to make a vessel for cooking food made of aluminum suitable for being used on an induction cooktop, on at least the outer surface of the bottom wall of such vessel one or more layers of a magnetic material have to be applied. As a matter of fact, the magnetic material, by interacting with the magnetic flux of the cooktop inductors, quickly warms up and transfers the heat to the vessel of aluminum which adheres thereto.

Systems for obtaining said result have been developed over time. In a first system, seldom used, a ferritic material is applied on the vessel bottom by way of expensive technologies so-called "cold spray" or "plasma spray". Another, mostly used, system instead consists of applying a ferritic steel disk to the outer surface of the bottom wall of a vessel made of aluminum.

During the operation of applying a disk made of a ferritic steel to the bottom of a vessel made of aluminum there are two fundamental issues to be addressed. The first problem consists in ensuring a good stapling between the disk made of steel and the bottom made of aluminum. The second problem consists in restraining the deformation that the disk made of steel generate on the bottom of aluminum, due to the different thermal expansion between steel material and aluminum material (the thermal expansion coefficient of steel is approximately half of that of aluminum). Therefore, when a disk made of ferritic steel is applied, it generates strong tensions that bend the bottom of the vessel, centrally lifting it from the cooktop and generating a radial lack of homogeneity in case of presence of oils, fats, and, more in general, liquids during the cooking step, the result of which is an irregular distribution of such liquids on the bottom of the cooking vessel.

Several technologies for joining or stapling the ferritic components to the base made of aluminum of a cooking vessel for cooking food have been developed over time. The main technologies are indicated here below:

1) applying the disk made of a ferritic steel by way of a braze welding process. A silver-based paste is smeared between the surfaces in contact. When this paste is brought up to approximately 500° C., it fuses and joins the two parts;
2) applying the disk made of a ferritic steel by way of the "impact bonding" technology, which consists of an instantaneous heat pressing by way of a powerful press which makes the contact materials rub against each other, thus joining together by superficial fusion;
3) applying the disk made of a ferritic steel, the holes of which are suitably machined (in general the perimeter of the holes is cone-shaped), in order to create filler undercuts suitable for preventing the separation of the two parts, by way of cold high-power pressing;
4) the ferritic material is inserted through a ferritic steel mesh due to the natural presence of a continual wire undercut;
5) applying the disk made of a ferritic steel, properly perforated, by way of stapling, so that the "mild" bottom made of aluminum protrudes from the holes of the disk and expands like a nail head;
6) applying the disk made of a ferritic steel, properly perforated, by a pressing operation, so that axial plane profiles with radial filling of the perforation of the axial planes themselves are created during the pressing operation, thus hindering the axial movement of separation.

Applications which use such technologies are known: U.S. 2009/321453 A1 is an example of using the technology described in point 2, whereas EP 2105071 A1 is an example of using the technology described in point 5. However, most of the applications present on the market use the best-known technology, which is described in point 3. As to this technology, the most recent applications are oriented to study particular configurations aiming at lowering bottom distortions during the heating-up step. Documents KR 2010 0117410 A, WO 2019/111761 A1 and KR 2004 0023418 A can be mentioned as examples.

The above-mentioned technologies 1, 2, 4, 5 and 6 are the most appropriate to guarantee joining and tightness of the parts, but they are industrially the most challenging. In addition, all those technologies, apart from technology 6, not necessarily guarantee a reduction of bottom deformation resulting from difference of thermal expansion, as mentioned above. In order to limit the impact of this problem, normally the disks made of a ferritic material are cut, so as to eliminate their continuity and distribute the deformation. Alternatively, the disk made of a ferritic material might be engraved with a shape that is structurally resistant to deformation, as in the above-mentioned technology 6, so that the advantages of reducing the deformation are partially mitigated by the disadvantage of not having a flat bottom (disadvantage which might also be present in technology 5).

In order to mitigate the problem of bottom deformation, it is also possible to "disconnect" the connection between the parts, thus allowing the deformation to be independent. A special case of the latter solution is that of using meshes comprising wires made of a ferritic steel, also called metallic fabrics. The advantage of these meshes is twofold:
  every single wire is autonomous and hence the mesh exerts a natural distribution of the deformation, which takes place through the independent stretching of every single wire;
  the small section of every single wire allows for a stretching with relatively low tensions, its section being reduced by a negligible extent.

In contrast, the use of meshes collides with some limitative problems of use, essentially bound to the commercial difficulty of finding meshes in its ferritic version and to the lack in the meshes of shape planarity that is necessary for a correct and functional industrialization. In addition, ferritic steel meshes present a further problem due to the presence of a non-configured peripheral edge.

As already said, the most current technology is that described in point 3. The main problem of its use consists in having to and knowing how appropriately profile the perimeter of the holes or slots, so as to create an undercut flaring capable of containing the disk joined to the support, even under tension conditions resulting from thermal expansions. The various existing applications such as, for instance, that described in the above-mentioned patent literatures, aims at limiting, through special configurations of through holes, the deformation and its respective tensioning, but they do not completely solve the critical aspect of a correct cohesion between the disk made of a ferritic material and the support made of aluminum. It should also be added that effectiveness of a hole profiling collides with the possibility of obtaining adherent holes.

An object of the present invention is thus to provide a cooking vessel for cooking food that is capable of solving the above-mentioned drawbacks of the prior art, with special reference to technologies 3 and 4, in an extremely simple, cost-effective and particularly functional manner.

In details, an object of the present invention is to provide a cooking vessel for cooking food wherein a correct cohesion of the part components, formed of the cooking vessel itself and its respective bottom disk made of a ferritic material, is guaranteed, while also limiting its deformation.

The priority object of the present invention is to implement a cooking vessel for cooking food wherein the cohesion of the above-mentioned part components is not only assured but also easier, with respect to the known type technologies described in point 3, without having to resort to special counterbores or profilings in the perimeters of the holes, but by using plates obtained just from a blanking process.

These objects and others according to the present invention are achieved by implementing a cooking vessel for cooking food and a respective bottom wall featuring a differentiated perforation pattern in a weighted ratio.

Further features of the invention are highlighted in the description, which form an integral part of the present disclosure.

BRIEF DESCRIPTION OF THE DRAWINGS

The features and advantages of a cooking vessel for cooking food according to the present invention will be more apparent from the following exemplary, non-limitative description, which makes reference to the schematic drawings attached hereto, wherein.

DETAILED DESCRIPTION OF THE PREFERRED EMBODIMENTS

Figure 1:
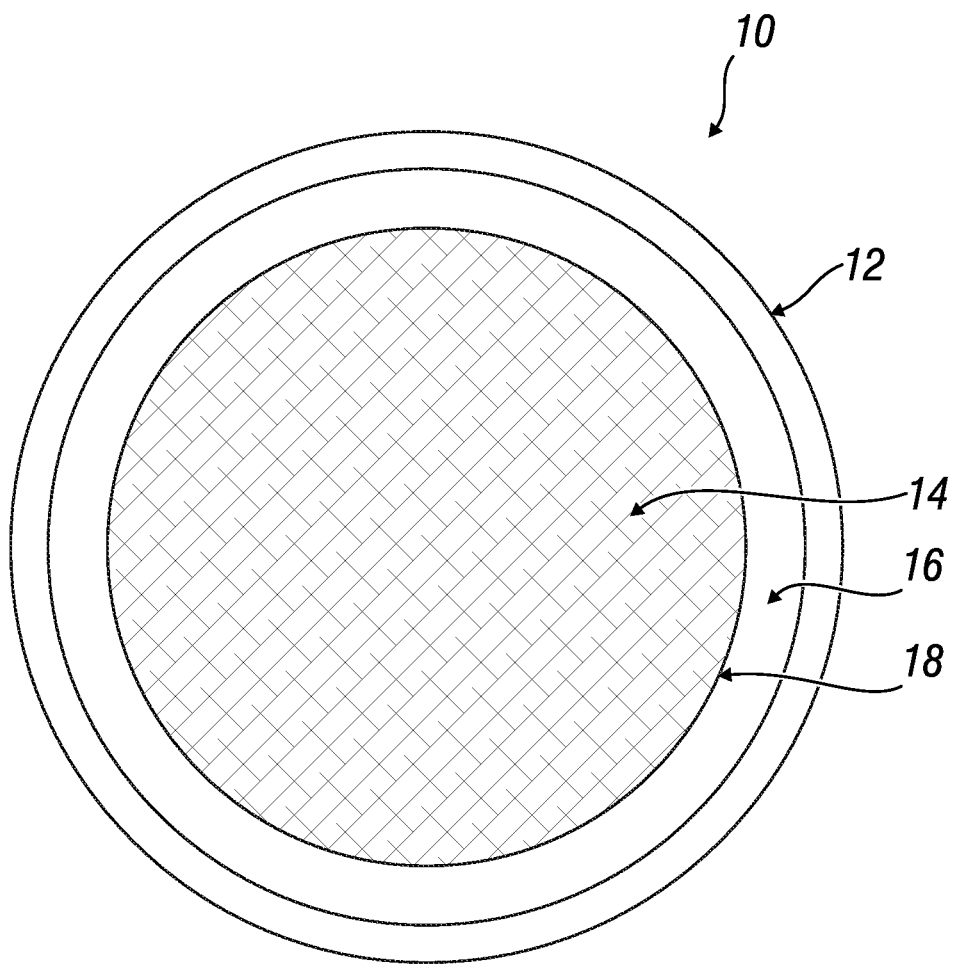
FIG. 1 is a plan view of a cooking vessel for cooking food which can be provided with a bottom wall with differentiated perforation pattern in a weighted ratio according to the present invention.
Figure 2:
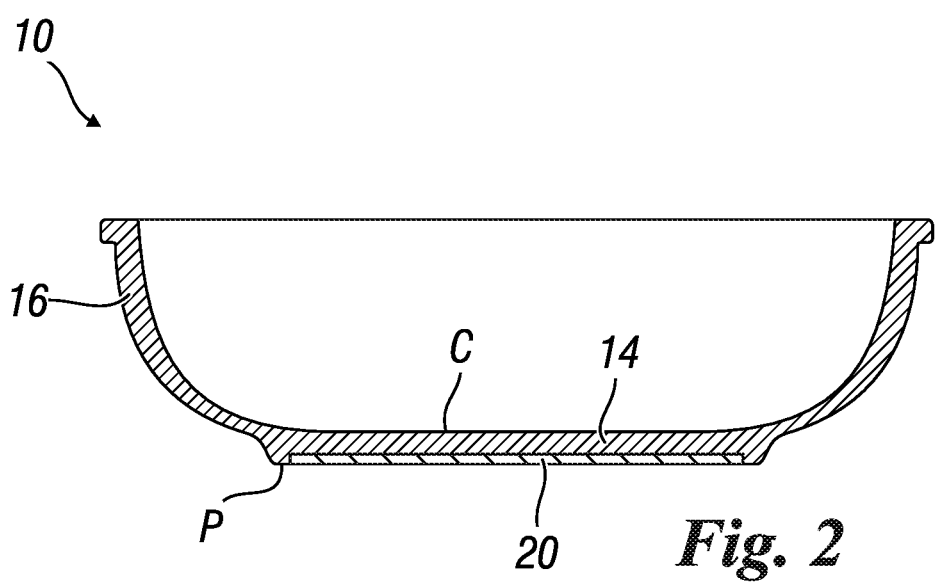
FIG. 2 is a cross sectional view of the cooking vessel of FIG. 1.

With reference to FIGS. 1 and 2, a cooking vessel for cooking food is shown, identified by the reference number 10 as a whole. The cooking vessel 10 comprises a body 12 comprising in its turn a bottom wall 14 and at least one side wall 16 which extends from such bottom wall 14. At least the bottom wall 14 of the cooking vessel 10 is made of aluminum.

In the embodiment shown in FIGS. 1 and 2 the cooking vessel 10 is a conventional pan provided with a substantially circular bottom wall 14. The pan comprises one side wall 16 only which extends from the bottom wall 14 and, more specifically, from the circular edge of the bottom wall 14. In any case, the cooking vessel 10 might also be provided with a plurality of side walls 16, for example the cooking vessel 10 might have a bottom wall 14 featuring a quadrilateral shape. Irrespective of the shape of the cooking vessel 10, the side wall 16 extends from the bottom wall 14 in a conventional and intrinsically known manner, so as to define an inner compartment 18 of the cooking vessel 10 wherein food is placed for being cooked.

Thus, the cooking vessel 10 comprises at least one plate-like component 20 made of a ferromagnetic material, integrally coupled with the bottom wall 14 at its respective outer surface, so as to at least partially cover such outer surface of the bottom wall 14. Preferably, the plate-like component 20 is configured for covering a central portion C of the outer surface of the bottom wall 14, leaving a respective peripheral portion P of the outer surface of bottom wall 14 which surrounds such central portion C, uncovered. The plate-like component 20 consists of a disk, which is preferably made of a ferritic steel, for instance of AISI 430 steel. Still preferably, the plate-like component 20 might have an average thickness ranging from 0.4 mm to 0.8 mm, as in the known standard.

According to the invention, the plate-like component 20 is divided into a plurality of first perforated areas 30 and a plurality of second perforated areas 32 mutually alternated in a symmetrical manner. Each first perforated area 30 has a first value VtS1 of void-to-solid ratio and each second perforated area 32 has a second value VtS2 of void-to-solid ratio. The first value VtS1 of void-to-solid ratio is greater than the second value VtS2 of void-to-solid ratio. As known in the field of perforated sheets, the void-to-solid ratio (VtS), expressed in percentage and also referred to as passage percentage, is the ratio between the perforated free surface and the respective total surface of a determined area of a sheet metal. In particular, the total surface of the first perforated areas 30, featuring a greater void-to-solid ratio VtS1, is in a proportion of about 1:3 with respect to the total surface of the second perforated areas 32, with a smaller void-to-solid ratio VtS2.

In other words, the disk that forms the plate-like component 20 is divided into alternate perforated zones or areas 30 and 32 wherein the perforation pattern is structurally different, apart from being different from each other by two different types of void-to-solid ratio (VtS). In particular, each second perforated area 32 has a low void-to-solid ratio, with a second value VtS2 of such void-to-solid ratio which is preferably smaller than 12%. Also, each second perforated area 32 is provided with second through holes 24 with a circular section and a small diameter, suitable for allowing and making the penetration of the parts in contact easier with a limited removal of ferritic material from the plate-like component 20 and thus providing a high yield in the energy absorption. Preferably, the second through holes 24 have a diameter ranging from 1 mm to 2 mm.

Each first perforated area 30 has, on the contrary, a high void-to-solid ratio, with a first value VtS1 of such void-to-solid ratio that is preferably greater than 50%. Each first perforated area 30 is also provided with first through holes 22 with a polygonal section, arranged like a continual mesh in order to provide elasticity to the structure of the plate-like component 20 and making its penetration in the aluminum matrix which will form the cooking vessel 10, easier. Preferably, the first through holes 22 have a hexagonal section.

In the rest of the present description, to make reading easier, the first perforated areas 30, which have a high void-to-solid percentage, will be referred to as "macro-perforated areas" or "macro-perforations". Consequently, the second perforated areas 32, which have a low void-to-solid percentage, will be referred to as "micro-perforated areas" or "micro-perforations".

The preferably polygonal, and more preferably hexagonal, shape of the macro-perforated areas 30 makes a pluri-directionality of the deformations possible, with a consequent high degree of elasticity of the structure of the plate-like component 20 and an easy penetration into the aluminum matrix. The shape like a macro-perforated spider's web 30 allow, as already said, for an easy penetration into the aluminum support of the bottom of the cooking vessel 10, while guaranteeing tightness, as it were a wide-link metallic fabric or mesh.

Figure 3:
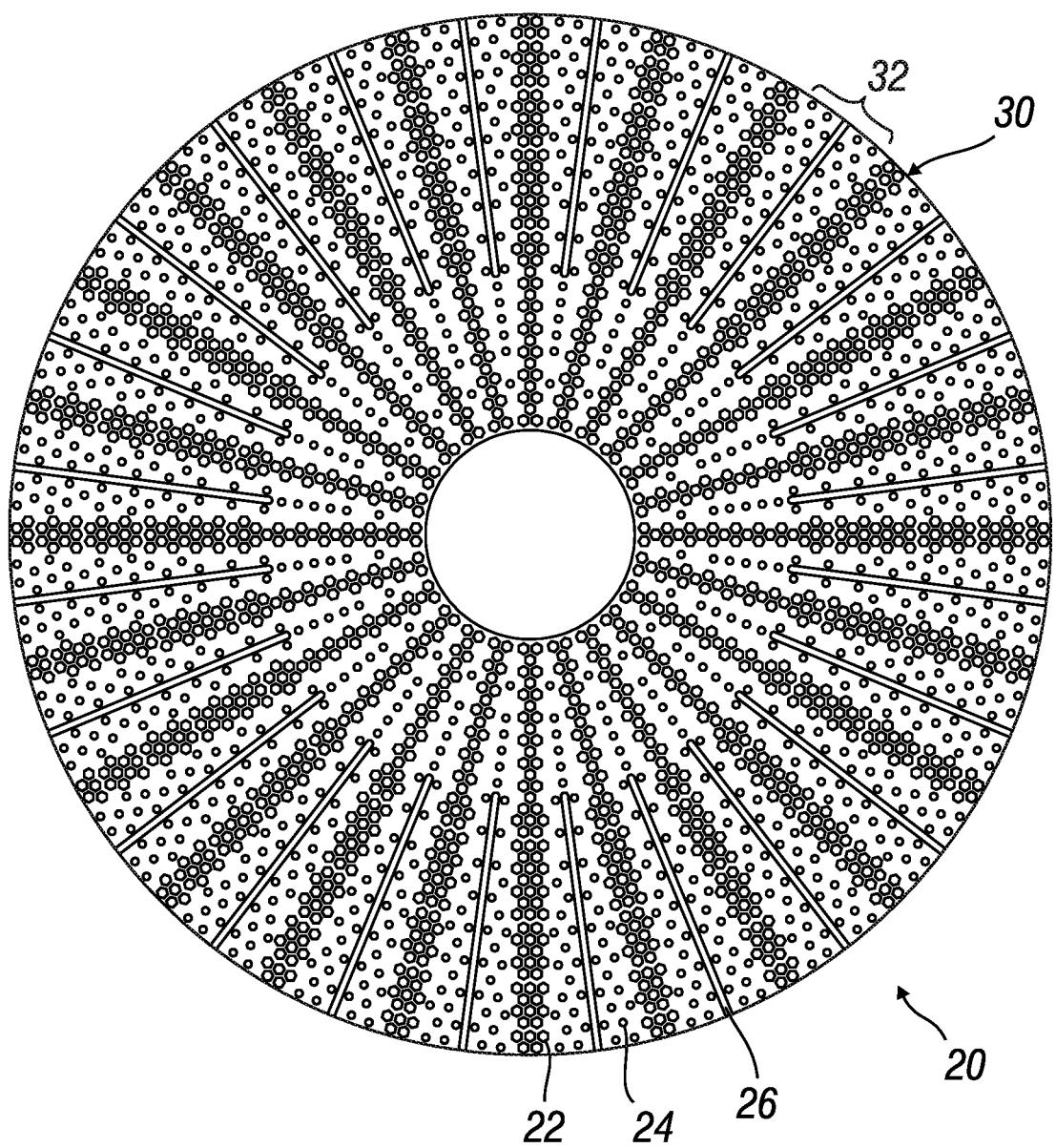
FIG. 3 is a plan view of a perforated disk which forms a bottom wall with a differentiated perforation pattern in a weighted ratio according to the present invention.
Figure 3A:
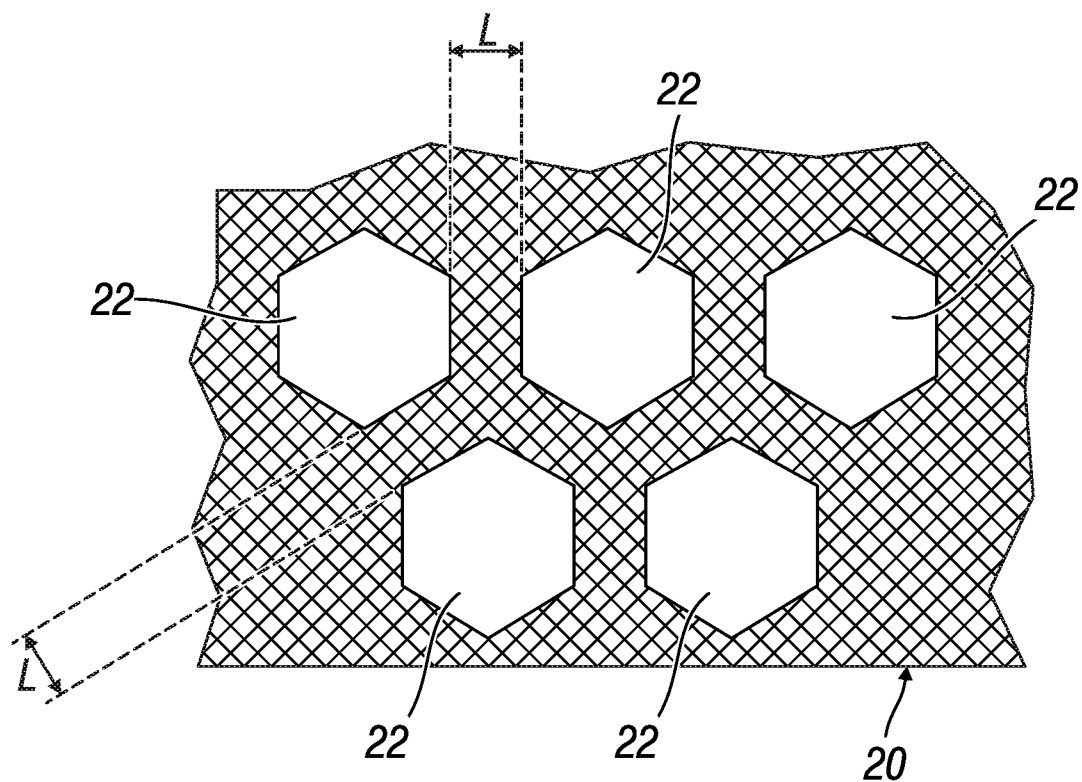
FIG. 3A is a considerably enlarged view of a detail of FIG. 3.
Figure 4:
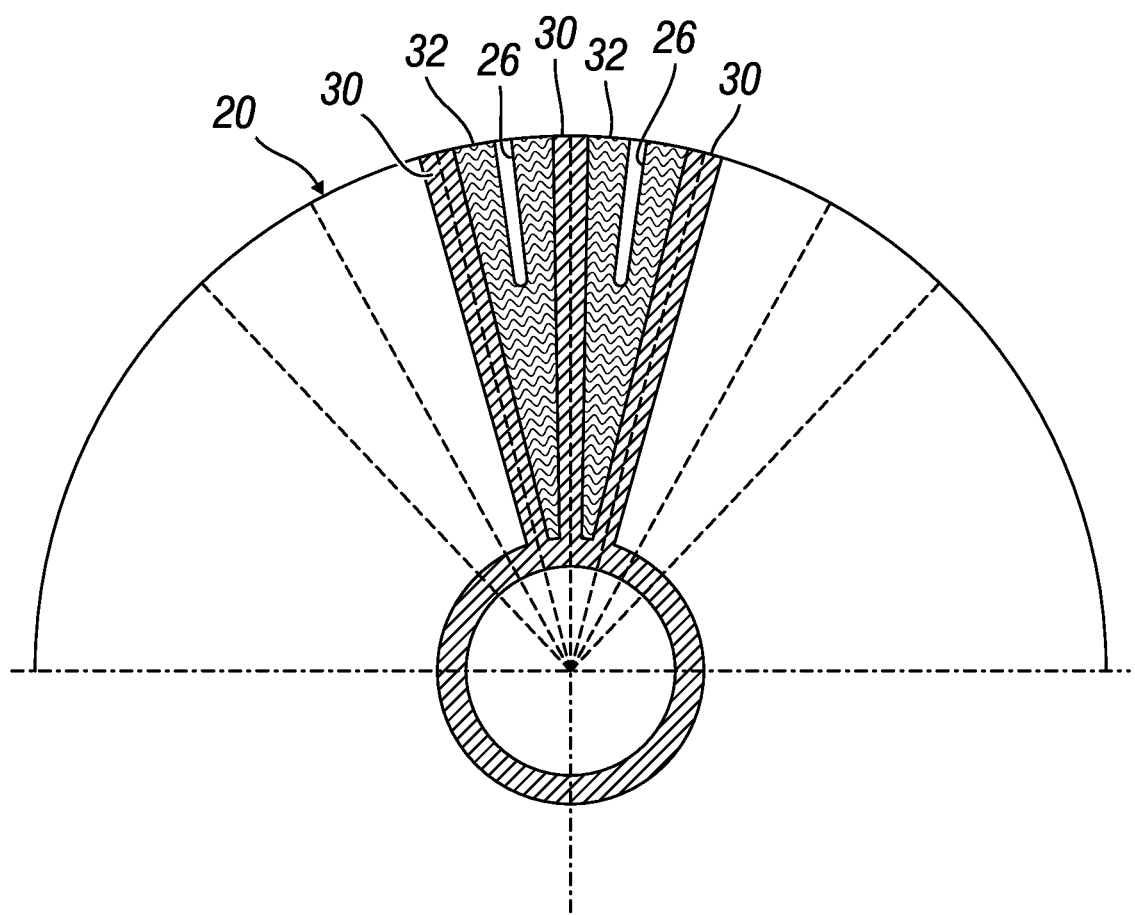
FIG. 4 is a schematic view of a first embodiment of a bottom wall with a differentiated perforation pattern in a weighted ratio according to the present invention.
Figure 5:
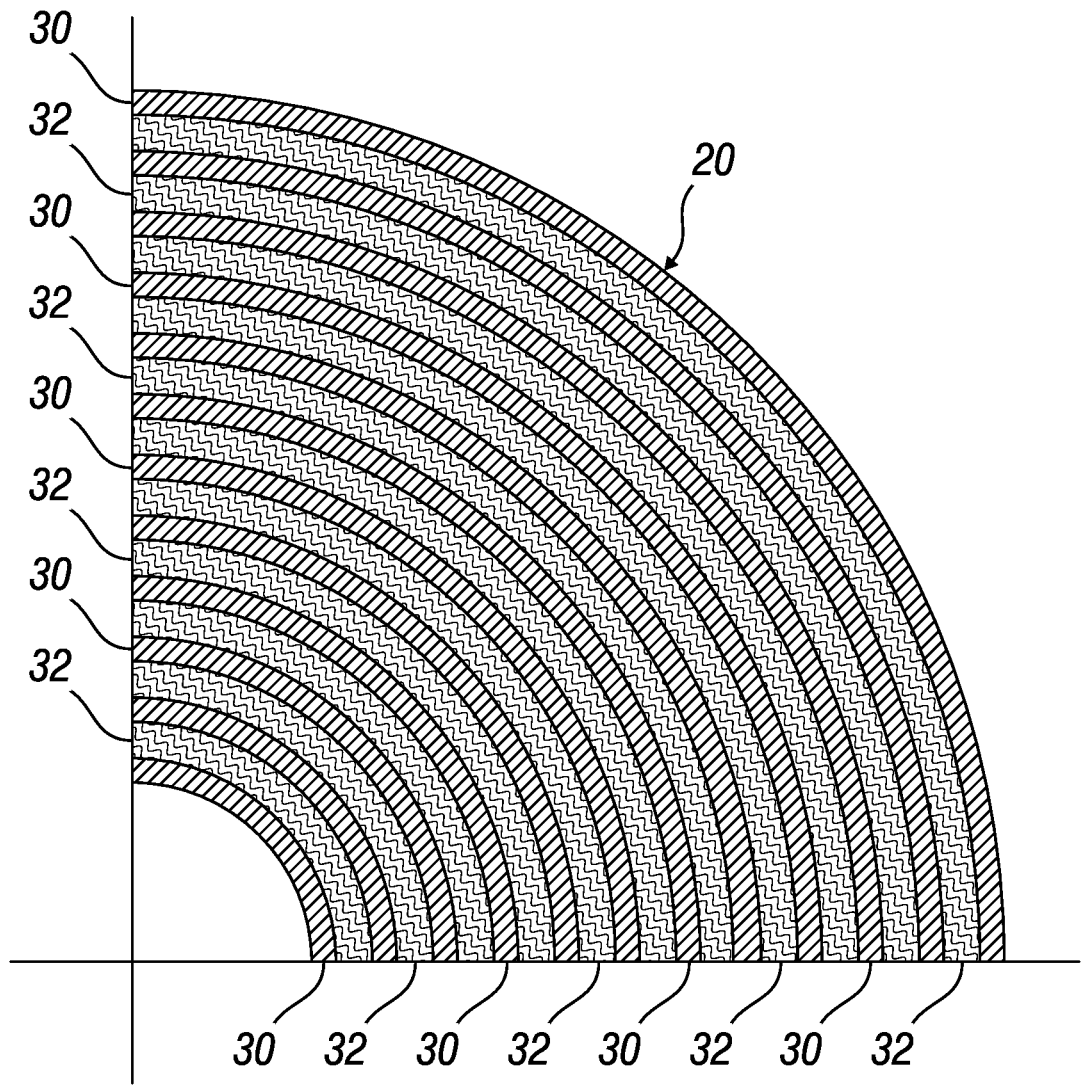
FIG. 5 is a schematic view of a second embodiment of a bottom wall with a differentiated perforation pattern in a weighted ratio according to the present invention.

As shown in the enlargement of FIG. 3A, the macro-perforated areas 30 are provided with first through holes 22 preferably having a mutual distance L which is substantially constant. Still preferably, the value of this distance L ranges from 0.6 mm to 1.4 mm. The dimension of the holes of the macro-perforated areas 30 is selected in such a way as to have a high density of holes, preferably about 15 holes per $cm^2$, to grant a high penetration capacity and cohesion to the support. The macro-perforated areas 30 and the micro-perforated areas 32 can alternate in a symmetrical manner in the geometry of the plate-like component 20 either along radial bands (FIG. 4) or along circumferential bands (FIG. 5), as well as both along alternate radial and circumferential bands.

It is known that the effectiveness of warming up with an induction source is, in the first instance, proportional to the mass of ferritic steel capable of interacting with the inductor. Consequently, if the whole structure of the plate-like component 20 was macro-perforated, we would get to a solution valid from a cohesion point of view, but it would be insufficient with respect to the thermal efficiency due to the scarcity of mass. So, the micro-perforated areas 32 have the task of recovering mass and bring the bottom of the cooking vessel 10 back to ferritic balance.

Unlike the systems according to the prior art for joining the ferritic disk to the bottom of the cooking vessel, according to which the structure of the disk is unique and simultaneously performs the functions of cohesion and efficiency, the plate-like component 20 according to the present invention geometrically separates the functions, by mainly assigning to the macro-perforated areas 30 the cohesion and elasticity functions, whereas the micro-perforated areas 32 have the main function of interacting with the electromagnetic source, and for this purpose is properly used with a very low void-to-solid ratio. The latter makes it possible to geometrically measure the two functions and, if desired, to adjust the heating speed of the cooking vessel 10, as well as, if necessary, to be able to create a safety thermal upper limit (for instance a maximum operating temperature of the cooking vessel 10 of approximately 350° C.), by measuring thermal distribution.

According to such embodiment, the two areas (macro-perforated 30 and micro-perforated 32), to exert their own above-described function in an effective manner, must have a considerably surface extension, so as to balance their respective tasks in an effective manner. As a result, a ratio between the same surfaces is defined, whereby the surface of the macro-perforated surface 30 represent about a quarter of the whole surface of the plate-like component 20. More in general, it can be said that the surface of the macro-perforated area 30 will occupy from 20% to 30% of the surface of the plate-like component 20, whereas the surface of the micro-perforated area 32 will occupy the remaining part, i.e. from 70% to 80%, of the surface of the plate-like component 20.

Both the macro-perforated areas 30 and the micro-perforated areas 32 are calibrated so as to limit energy absorption. Obviously, both the macro-perforated areas 30 and the micro-perforated areas 32 can assume different shapes by themselves, but also with reference to their geometric distribution on the surface of the plate-like component 20.

Anyway, the main feature of the macro-perforated areas 30 is that of having a low-thickness metal spider's web in order to provide great easiness and tightness of penetration, and in addition to provide high elasticity to the plate-like component 20. As to the micro-perforated areas 32, they have a high percentage of non-perforated part to maintain a high ferritic mass of the plate-like component 20. The perforation pattern of the plate-like component 20 can also provide the presence, as in the prior art, of at least one part of the micro-perforated areas 32 and in addition to their respective second through holes 24, of one or more cuttings 26 properly arranged and measured so as to implement the feature aimed at limiting the deformation of the bottom of the cooking vessel 10. These cuttings 26 might be arranged radially (as shown in the embodiment depicted in FIGS. 3 and 4) and/or circumferentially on the plate-like component 20.

In all the described cases, all the holes are made by a simple plan blanking, without any particular measures of profiling the perimeters of the holes, as provided in the most known and used techniques. Also, the holes have a distribution the density of which is as constant as possible, so as to provide a uniform and symmetrical result of the areas which they occupy.

In other words, unlike the known techniques, that in general rely on using a perforation pattern, even if differentiated and distributed with a sufficient uniformity, the technique used herein relies on creating, by alternating them, two areas well differentiated, i.e. a first limited area with small polygonal holes arranged very close to each other and uniformly distributed, for cohesion purposes, and a second wider area, also with small holes but more scattered, in order to have a balance of the total ferritic mass.

In light of the present description, existent technical differences are highlighted against those in the most pertinent documents of the prior art.

In document EP 2105071 A1 the hole flaring technique to provide the cohesion of the ferritic plate to the bottom does not allow for reducing the distance of the holes to the dimensions provided herein in the micro-perforated zone (0.6 mm-1.4 mm). In addition, in a round hole configuration this distance cannot be implemented at a constant value.

In document US 2009/321453 A1 the implementation by "impact bonding" technology does not provide perforations of cohesion (which takes place by a rubbing operation of the component parts), but only the execution of multidirectional slots having the task of partially absorbing the tensions due to the thermal expansions. This document does not use any perforation patterns in a symmetric manner assimilable to that in accordance with the present invention.

In document KR 2010 0117410 A the assessable innovation is that of providing a ferritic plate of an outer perimeter, shaped so as to go into the support constituting the bottom of the cooking vessel for preventing it of being ejected due to cohesion failure in the peripheric part. The geometric configuration of the holes in radial sectors delimited by radial rows of square holes is the conventional one of the applications performed by the technique described in point 3, with the particularity of increasing the density close to the center and decreasing it towards the periphery, being able to rely on the tightness of the edge, as said above. The present invention, partially assimilable to that according to document KR 2010 0117410 A with regard to the micro-perforated part, is structurally different due to three peculiarities:
a) to provide a uniform presence of cohesion, as a first approximation the perforation density of the two areas is constant;
b) to ensure its function of penetration and tightness, the macro-perforated zone, with polygonal holes, is structured with a particular density like a mesh, and occupies a considerable area;
c) to the polygonal perforations, a function of cohesion and not of easy separation of sectors as anti-distortion elements is assigned.

Both applications disclosed in documents WO 2019/111761 A1 and KR 2004 0023418 A, in a different but similar manner, search for a perforation distribution pattern of the ferritic plate capable of minimizing the deformation due to tensions resulting from thermal expansions, theoretically more efficient in the first case in comparison with the second one. Both applications provide big, sufficiently uniform perforation sectors, with round holes interrupted by long slots. Such type of implementation, even tightening the perforation pattern, cannot create, by itself, a reticular structure capable of penetrating into the support to ensure the cohesion thereof, whereby it is absolutely necessary to resort to particular shapes of the perimeter of the holes, circumstance that the present invention wishes to avoid. Also, in order to maintain an effective function of electromagnetic absorption, it must limit the areas occupied by the non-rounded through holes.

Finally, WO 2013/115176 A1 refers to a special application having, both in the center and in the periphery of the bottom, two heating ring-shaped elements. To obtain a correct heat stream, the perforation pattern has a macro-perforated geometry, alternating rectangular and round holes. With such structure, cohesion can be guaranteed only with holes properly shaped, circumstance that the present invention wishes to avoid.

It has been shown that the cooking vessel for cooking food according to the present invention achieves the previously highlighted objects.

The thus conceived cooking vessel for cooking food according to the present invention is susceptible in any case of numerous modifications and variants, all falling within the same inventive concept; also, all details are replaceable by technically equivalent elements. In practice the materials used, as well as shapes and dimensions, might be whatsoever depending on the technical requirements.

The scope of the invention is therefore that set forth in the attached claims.

The invention claimed is:

1. A cooking vessel for cooking food, comprising:
a body comprising in its turn a bottom wall and at least one side wall, wherein said side wall extends from said bottom wall to define an inner compartment of the cooking vessel in which the food is arranged for being cooked and wherein at least said bottom wall is made of aluminum; and
at least one plate-like component consisting of a disk made of a ferromagnetic material, integrally coupled with said bottom wall at the respective outer surface, to at least partially cover said outer surface of the bottom wall, said at least one plate-like component being provided with a plurality of through holes,
wherein said at least one plate-like component is divided into a plurality of first perforated areas and a plurality of second perforated areas mutually alternated in a symmetrical manner, wherein each first perforated area has a first value (VtS1) of void-to-solid ratio and each second perforated area has a second value (VtS2) of void-to-solid ratio, and wherein said first value (VtS1) of void-to-solid ratio is greater than said second value (VtS2) of void-to-solid ratio,
wherein the total surface of said first perforated areas, featuring a greater void-to-solid ratio (VtS1), is in a proportion of about 1:3 with respect to the total surface of said second perforated areas, featuring a smaller void-to-solid ratio (VtS2), and
said first perforated areas are provided with first through holes aligned like a spider's web and having a mutual constant distance (L), the value of which ranges from 0.6 mm to 1.4 mm,
wherein each of said first perforated areas is provided with first through holes featuring a polygonal section and has the first value (VtS1) of void-to-solid ratio which is greater than 50%,
wherein each of said second perforated areas is provided with second through holes featuring a circular section and has the second value (VtS2) of void-to-solid ratio which is smaller than 12%.

2. The cooking vessel according to claim 1, wherein the holes density of said first perforated areas is approximately 15 holes per cm$^2$.

3. The cooking vessel according to claim 2, wherein each of said first perforated areas and said second perforated areas mutually alternate along circumferential bands first through holes is a hexagonal section.

4. The cooking vessel according to claim 1, wherein said second perforated areas are provided with second through holes having a diameter ranging from 1 mm to 2 mm.

5. The cooking vessel according to claim 1, wherein said first perforated areas take up a surface area of the plate-like component ranging from 20% to 30%.

6. The cooking vessel according to claim 1, wherein said second perforated areas take up a surface area of the plate-like component ranging from 70% to 80%.

7. The cooking vessel according to claim 1, wherein ach of said first perforated areas and said second perforated areas mutually alternate along radial bands.

8. The cooking vessel according to claim 1, wherein said first perforated areas and said second perforated areas are calibrated to limit the maximum energy absorption and the consequent operating temperature of said cooking vessel, so that said operating temperature does not exceed 350° C.

9. The cooking vessel according to claim 1, wherein said second perforated areas are provided with second through holes having a diameter ranging from 1 mm to 2 mm, wherein said first perforated areas take up a surface area of the plate-like component ranging from 20% to 30%,
wherein said second perforated areas take up a surface area of the plate-like component ranging from 70% to 80%.

10. The cooking vessel according to claim 9, wherein each said polygonal section of said first through holes is a hexagonal section and the perforation density of the first and second perforated areas is constant.

11. The cooking vessel according to claim 10, wherein said at least one plate-like component further comprising one or more cuttings within respective said second perforated areas on the plate-like component for limiting deformation of the bottom wall of the cooking vessel.

12. The cooking vessel according to claim 11, wherein said one or more cuttings are radially arranged within the respective second perforated areas on the plate-like component.

13. The cooking vessel according to claim 1, wherein said at least one plate-like component further comprising one or more cuttings within respective said second perforated areas on the plate-like component for limiting deformation of the bottom wall of the cooking vessel.

14. The cooking vessel according to claim 13, wherein said one or more cuttings are radially arranged within the respective second perforated areas on the plate-like component.

* * * * *

UNITED STATES PATENT AND TRADEMARK OFFICE
CERTIFICATE OF CORRECTION

PATENT NO. : 11,844,460 B2
APPLICATION NO. : 17/612444
DATED : December 19, 2023
INVENTOR(S) : Jacopo Ferron and Francesco Ferron It is certified that error appears in the above-identified patent and that said Letters Patent is hereby corrected as shown below:

In the Claims

Claim 3, Column 8, Lines 44-45, should read as follows:
-- The cooking vessel according to claim 2, wherein
said first perforated areas and said second perforated areas --

Claim 7, Column 8, Lines 57-58, should read as follows:
-- The cooking vessel according to claim 1, wherein
said first perforated areas and said second perforated areas --

Signed and Sealed this
Thirtieth Day of January, 2024

*Katherine Kelly Vidal*
Katherine Kelly Vidal
*Director of the United States Patent and Trademark Office*